United States Patent [19]

McCabe et al.

[11] Patent Number: 5,025,682
[45] Date of Patent: Jun. 25, 1991

[54] TRANSMISSION SOLENOID RETAINING CLIP

[75] Inventors: Ralph P. McCabe, Troy; Lawrence McAuliffe, Jr., Ann Arbor, both of Mich.

[73] Assignee: Coltec Industries Inc., New York, N.Y.

[21] Appl. No.: 539,489

[22] Filed: Jun. 18, 1990

[51] Int. Cl.$^5$ ..................... F16H 57/02; F16B 21/18
[52] U.S. Cl. ................................. 74/606 R; 411/516; 411/517
[58] Field of Search .................. 74/606 R, 606 A; 24/328, 346, 573.5, 573.1; 411/516, 517, 353

[56] References Cited

U.S. PATENT DOCUMENTS

| | | | |
|---|---|---|---|
| 2,385,565 | 9/1945 | Cox | 411/516 |
| 3,115,225 | 12/1963 | Fraylick et al. | 411/516 |
| 3,176,731 | 4/1965 | Minard | 411/516 X |
| 3,260,989 | 7/1966 | Curtis | 411/516 X |
| 3,298,409 | 1/1967 | Elson | 411/516 X |
| 3,787,134 | 1/1974 | Burr | 411/517 X |
| 4,099,444 | 7/1978 | Millheiser et al. | 411/517 |
| 4,714,128 | 12/1987 | Yoshinaka et al. | 74/606 R X |
| 4,798,075 | 1/1989 | Killian et al. | 411/517 X |

FOREIGN PATENT DOCUMENTS 0094148 11/1962 Denmark ..................... 411/516

Primary Examiner—Vinh T. Luong
Attorney, Agent, or Firm—Richard W. Watson

[57] ABSTRACT

A combination for retaining a solenoid valve assembly in position on a transmission housing comprises a protrusion on the housing and a resilient U-shaped clip. The protrusion has a cylindrical pocket to receive a portion of the solenoid assembly and a clip receiving slot which is perpendicular to the cylindrical axis of the pocket. The clip is substantially planar and holds the solenoid assembly in place by simultaneously engaging aligned slots in the protrusion and in the solenoid assembly. At the free ends of the U-shaped clip are inwardly extending toe portions which cause opposed arms of the clip to be flexed resiliently outwardly as the clip is inserted into or withdrawn from the aligned slots in the protrusion and in the solenoid assembly. Broad bladed legs intermediate the arms and toes enable the clip to withstand fluid pressure which tends to eject the solenoid assembly from the pocket.

14 Claims, 2 Drawing Sheets

TRANSMISSION SOLENOID RETAINING CLIP

BACKGROUND OF THE INVENTION

1. Field of the Invention

The invention relates to an assembly whereby a cylindrical element, such as a solenoid valve, is locked into a pocket in a wall of a transmission housing.

2. Background Art

Various means and methods have been used to hold solenoid or other cylindrical elements in operating position on the walls of transmission housings or the like. Assemblies have been made utilizing a generally U-shaped clip which engages slots in the housing and in the cylindrical elements and which is held in place by an access plate or cover which must be removed to permit original installation or subsequent removal or replacement of the clip.

In instances where some movement or variation in the positioning of the cylindrical element along its axis is permissible, a simple spring clip may be used to frictionally engage opposite sides of the cylindrical element. However, such an arrangement leaves open the possibility that the element may readily, and perhaps accidentally, be separated from the retaining clip. Furthermore, such a simple clip is unsatisfactory when there is a substantial pressure differential between the ends of the solenoid tending to eject the solenoid from its pocket.

SUMMARY OF THE INVENTION

In order to overcome the above-recited and other problems, the present invention provides a simple yet effective means for retaining or locking a generally cylindrical element in a positive location on a transmission housing or the like. Thus, a generally cylindrical pocket is provided in a protruding wall portion of a transmission housing and a generally U-shaped clip having a resilient portion is inserted in aligned slots in the protruding wall portion and in the cylindrical element to be retained.

Accordingly, a primary object of the invention to provide a positive means and method to retain or lock a cylindrical member in a cylindrical pocket in a manner that precludes axial movement of the cylindrical member.

It is a further object to provide such retaining means which can be easily assembled to provide positive locking means and yet which can also be easily disassembled to permit removal of the cylindrical member.

Yet another object of the invention is to provide clip-type retaining means which is strong enough to withstand and overcome fluid pressure tending to eject a solenoid valve assembly from its desired operating position in a pocket and which, at the same time, has enough flexibility and resilience to permit easy installation and removal.

BRIEF DESCRIPTION OF THE DRAWINGS

A fuller understanding of the present invention will be gained by reference to the following detailed description when read in conjunction with the attached drawings in which.

DESCRIPTION OF THE PREFERRED EMBODIMENTS

Figure 1:
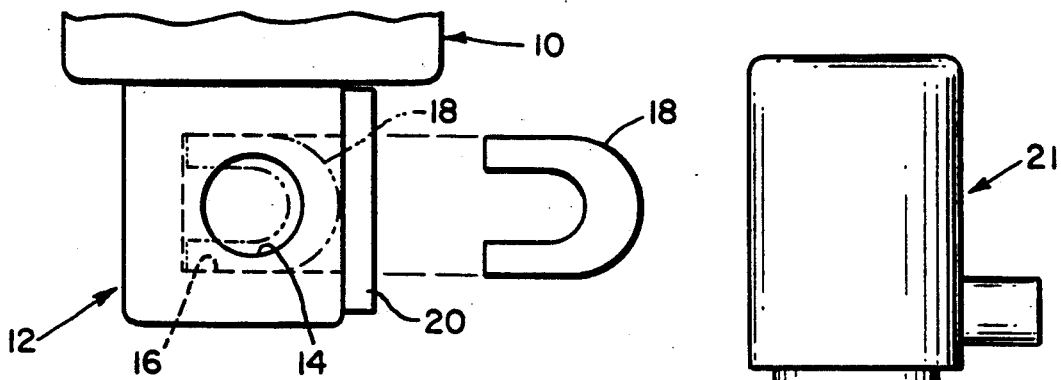
FIG. 1 is a partial plan view showing a prior art arrangement for retaining a solenoid valve assembly in a pocket on a transmission housing.

Referring now to the drawings, FIG. 1 illustrates a prior art arrangement for retaining a cylindrical element such as a portion of a solenoid valve assembly on the outside of a larger body such as a transmission housing. Accordingly, there is shown a portion of a transmission housing 10 having a protrusion or extension 12. In the protrusion there is an annular or cylindrical pocket 14 and a slot 16 generally transverse or perpendicular to the cylindrical axis of pocket 14. After solenoid element, not shown, is inserted into the cylindrical pocket 14, retaining clip 18 is inserted into slot 16 and then to keep retaining clip 18 in proper position, access plate 20 is placed over slot 16 and attached to protrusion 12 by any convenient and conventional means such as screws, bolts or the like, not shown. At such time as it is desired to remove the solenoid element from pocket 14, it is necessary to remove access plate 20 and then withdraw retaining clip 18 from slot 16.

Figure 2:
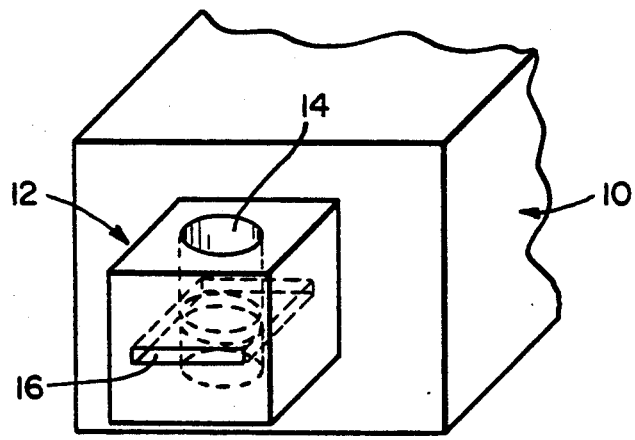
FIG. 2 is a partial perspective view of a preferred embodiment of a portion of the present invention.

The remaining figures depict the present invention. Thus, FIG. 2 shows a preferred embodiment with like numerals being used to identify lie parts as compared to the prior art embodiment illustrated in FIG. 1. Accordingly, transmission housing 10 includes a protrusion 12 on one of its walls. Protrusion 12 includes a cylindrical recess or pocket 14 having a closed bottom and a slot 16 transverse to and intersecting pocket 14.

Figure 3:
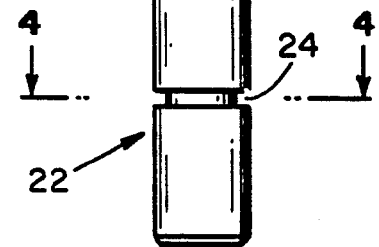
FIG. 3 is a side elevation of a solenoid valve having an element which might be retained by the combination of the present invention.
Figure 4:
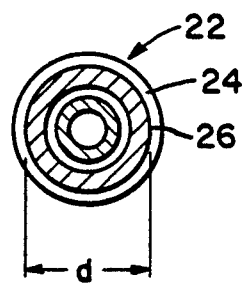
FIGS. 4 and 4A are enlarged sectional views taken along lines 4—4 and 4A—4A respectively of FIGS. 3 and 3A.
Figure 3A:
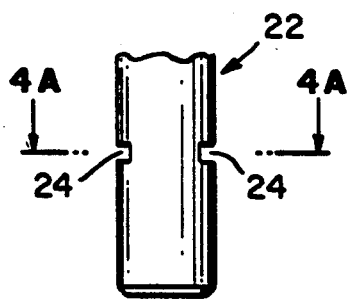
FIG. 3A is a partial side elevation of a slightly different solenoid element which might be retained by the combination of the present invention.
Figure 4A:
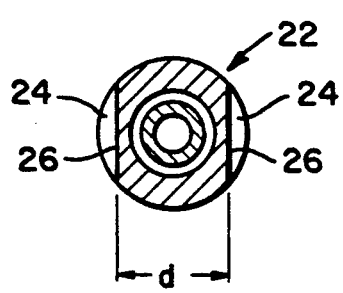

FIG. 3 illustrates a cylindrical solenoid valve assembly 21 including a solenoid element 22 which may be inserted in pocket 14 of protrusion 12. Solenoid element 22 has a slotted portion 24 which will align with slot 16 of protrusion 12. Slotted portion 24 may comprise a continuous slot as in FIG. 3 or a pair of partial slots as in FIG. 3-A. If partial slots are employed, they should preferably be spaced so as to be directly opposed to one another. The use of partial slots as in FIG. 3-A will be particularly useful if it is desired to prevent rotation of solenoid element 22 relative to its cylindrical axis. For convenience hereinafter in this specification, we will use the word "slots" whether referring to opposed portions of a continuous slot as shown in FIGS. 3 and 3A or partial slots as shown in FIGS. 4 and 4A.

Figure 5:
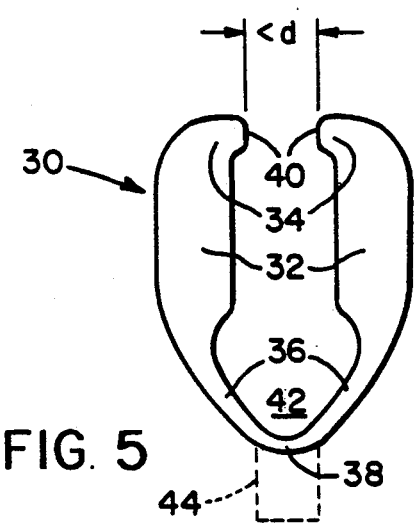
FIG. 5 is a plan view of a retaining clip which may be used in completing the present invention.

FIG. 5 shows a generally U-shaped retaining clip 30 having a pair of broad bladed legs 32, a toe portion 34 on each leg and a pair of utilizing arms 36 which are joined at juncture 38. Broad bladed legs 32 are wide enough to engage slot 16 in housing protrusion 12 as well as aligned slots 24 in solenoid element 22 or some other cylindrical element inserted into pocket 14. At the same time, legs 32 must have sufficient shear section or body to be able to hold solenoid element 22 in place and to withstand fluid pressure in the bottom of pocket 14, which pressure would otherwise eject the solenoid element from the pocket. When clip 30 is fully installed in slot 16, toe portions 34 extend inwardly toward one another so that toe ends 40 are closer together than roots 26 (see FIGS. 4 and 4A) of slots 24 of solenoid elements 22 in pocket 14. Expressed alternatively, the distance between toe ends 40 is less than distance d as shown in FIGS. 4 and 4A. Unitizing arms 36 are shaped and dimensioned so as to allow them to flex during installation which in return allows broad bladed legs 32 and toe portions 34 to move away from one another sufficiently to permit ends 40 of toe portions 34 to pass through the slots 24 of solenoid element 22 and then return to their unstressed condition without permanent deformation after they have passes completely through those slots. The sides of toe portions 34 are preferably sloped and more preferably rounded to facilitate passage of the toe portions through slots 24 as clip 30 is installed or removed. Installation of clip 30 may be accomplished by gripping the area of juncture 38 of arms 36 and pushing the clip into slots 16 and 24. Of course, slot 16 must be somewhat wider than the maximum width of clip 30 in its unflexed state to permit flexing of clip 30 during installation and withdrawal. Removal of clip 30 may be accomplished by gripping the area of juncture 38 and pulling the clip from said slots or alternatively by inserting a hook in open area 42 behind juncture 38 and again pulling the clip out of the slots. Optionally, a heel portion 44 (shown in dotted lines) may be included in the area of juncture 38 to provide additional planar gripping surfaces to further facilitate installation and removal of clip 30. Variations in the shape and material composition of clip 30 may be used as long as there is sufficient resilience to permit flexing of arms 36 without permanent deformation and sufficient strength to resist the fluid pressure in the bottom of pocket 14 and sufficient width to engage slots 16 and 24 simultaneously.

Figure 6:
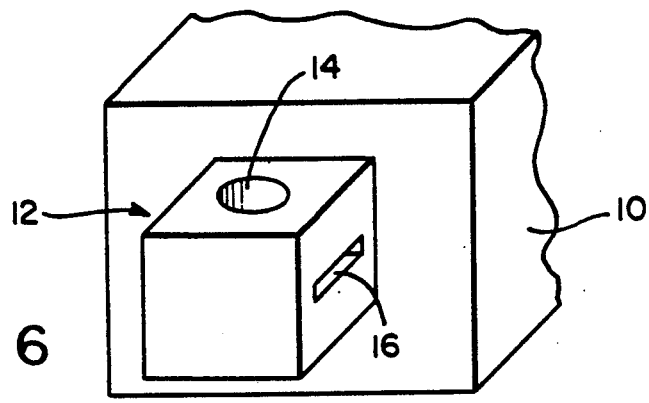
FIG. 6 is a partial perspective view showing a slightly modified embodiment of the transmission housing of FIG. 2.

In FIG. 6 there is illustrated a slightly modified version of the transmission housing of FIG. 2 wherein slot 16 has been rotated 90 degrees as compared to slot 16 of FIG. 2. Thus, in this embodiment, slot 16 extends parallel to the main wall of transmission housing 10 rather than being generally perpendicular as in FIG. 2. In a variation of this particular embodiment, slot 16 could extend completely through protrusion 12 so that a retaining clip of the type shown in FIG. 5 could be inserted from either direction.

Figure 8:
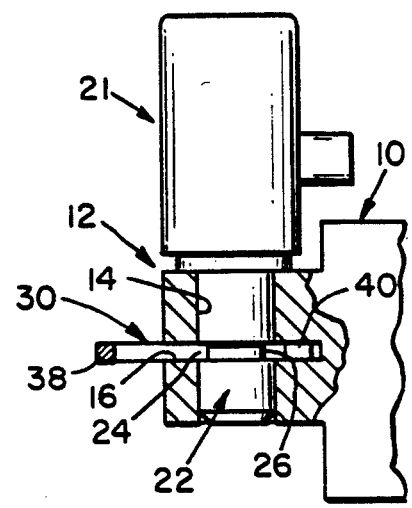
FIG. 8 is a partial side elevation of a preferred embodiment, shown partly in section.
Figure 7:
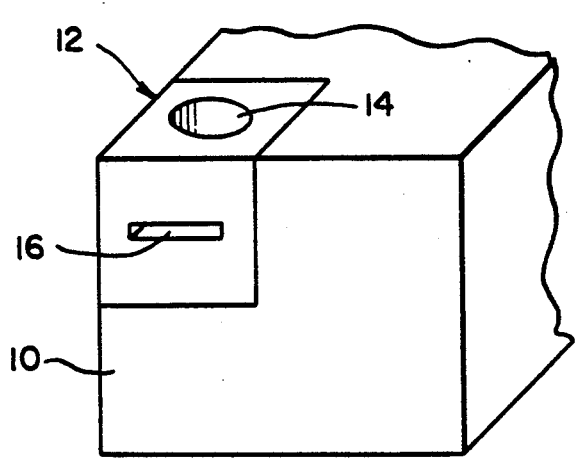
FIG. 7 is a partial perspective view showing yet another embodiment of the housing of FIG. 2.

FIG. 7 illustrates yet another possible embodiment of the invention in which protrusion 12 extends inwardly from the wall of transmission housing 10 rather than outwardly. Otherwise, all features would cooperate in the same manner whereby a solenoid element would be inserted in pocket 14 and a retaining clip would be inserted into slots 16 and 24 to retain the solenoid element in the pocket the manner of which assembly is shown in FIG. 8.

While preferred embodiments of the invention have been shown and described in detail, other modifications will be readily apparent to those skilled in the mechanical arts. Thus, the preceding specification should be interpreted as exemplary rather than as limiting and the scope of the invention is define by the following claims.

We claim:

1. In combination, a transmission housing having a wall and retaining means for positively retaining a generally cylindrical and slotted element in a generally cylindrical pocket in a protrusion of said housing wall, the combination comprising:
   (a) said protrusion of said wall of said transmission housing having therein said generally cylindrical pocket for receiving said generally cylindrical element and also having therein a slot generally perpendicular to the cylindrical axis of and intersecting said pocket and
   (b) said retaining means being a generally U-shaped retaining clip having a pair of broad bladed legs extending into and engaging said slot in said protrusion and adapted to engage simultaneously said slotted portion of said generally cylindrical element when said element is in a desired position in said pocket, each of said legs having an inwardly extending toe portion, said two portions being opposed to one another and separated by a distance less than the minimum diameter of said slotted portion of said generally cylindrical element to be retained and said legs being joined by a pair of resilient arms and a juncture between said arms.

2. The combination of claim 1 wherein said clip has a heel portion forming a generally planar extension of said juncture.

3. The combination of claim 1 wherein said protrusion extends outwardly of said transmission housing wall.

4. The combination of claim 1 wherein said protrusion extends inwardly of said transmission housing wall.

5. The combination of claim 1 further including a generally cylindrical and slotted solenoid element locked in position in said pocket by means of simultaneous engagement of said slots in said pocket and in said element by said retaining clip.

6. In combination,
   (a) a transmission housing having a wall and a generally cylindrical pocket in a protrusion of said wall, said protrusion having a slot substantially transverse to the cylindrical axis of and intersecting said pocket and
   (b) a generally U-shaped retaining clip having a pair of broad bladed legs extending into and engage said slot and adapted to engage simultaneously a slotted portion of a generally cylindrical element when said element is in a desired position in said pocket, each of said legs having an inwardly extending toe portion, said toe portions being opposed to one another and separated by a distance less than the minimum diameter of said slotted portion of said generally cylindrical element to be retained and said legs being joined by a pair of resilient arms and a juncture between said arms.

7. The combination of claim 6 wherein said clip has a heel portion forming a generally planar extension of said juncture.

8. The combination of claim 6 wherein said protrusion extends outwardly of said transmission housing wall.

9. The combination of claim 6 wherein said protrusion extends inwardly of said transmission housing wall.

10. The combination of claim 6 further including a generally cylindrical and slotted solenoid element locked in position in said pocket by means of simultaneous engagement of said slots in said recess and in said element by said retaining clip.

11. In combination a transmission housing having a wall, a solenoid valve assembly and retaining means positively locking a generally cylindrical and slotted element of said solenoid valve assembly in a desired position in a generally cylindrical pocket in a protrusion of said wall of said housing, the combination comprising (a) said protrusion of said wall of said transmission housing having therein a generally cylindrical pocket and also having therein a slot generally perpendicular to the cylindrical axis of and intersecting said pocket, (b) said generally cylindrical and slotted solenoid element inserted in said pocket and (c) said retaining means being a generally U-shaped retaining clip having a pair of broad bladed legs extending into and engaging said slot in said protrusion and simultaneously engaging said slotted portion of said solenoid element, each of said legs having an inwardly extending toe portion, said toe portions being opposed to one another and separated by a distance less than the minimum dimension of said slotted portion of said solenoid element and said legs being joined by a pair of resilient arms and a juncture between said arms.

12. The combination of claim 11 wherein said clip has a heel portion forming a generally planar extension of said juncture.

13. The combination of claim 11 wherein said protrusion extends outwardly of said transmission housing wall.

14. The combination of claim 11 wherein said protrusion extends inwardly of said transmission housing wall.

* * * * *